United States Patent [19]

Creighton et al.

[11] 4,323,897
[45] Apr. 6, 1982

[54] TARGET DETECTING DEVICE WITH IMPROVED COUNTER-COUNTERMEASURES CAPABILITY

[75] Inventors: Robert A. Creighton, Scottsdale, Ariz.; Stephen M. Engel, Columbia, Md.

[73] Assignee: The United States of America as represented by the Secretary of the Navy, Washington, D.C.

[21] Appl. No.: 40,522

[22] Filed: May 22, 1970

[51] Int. Cl.³ .................................................. G01S 7.36
[52] U.S. Cl. ................................... 343/18 E; 343/7.5; 343/17.1 PF
[58] Field of Search ................ 343/18 E, 7.5, 17.1 PF

[56] References Cited

U.S. PATENT DOCUMENTS

| | | | |
|---|---|---|---|
| 3,050,726 | 8/1962 | Laurent | 343/7.5 UX |
| 3,163,862 | 12/1964 | Jenny | 343/18 E |
| 3,303,498 | 2/1967 | Bacon | 343/7.5 |
| 3,381,292 | 4/1968 | Hansen | 343/7.5 X |

*Primary Examiner*—T. H. Tubbesing
*Attorney, Agent, or Firm*—Robert F. Beers; Ervin F. Johnston; Thomas M. Phillips

[57] ABSTRACT

A system which in response to a received signal, alters the transmit characteristics in a manner that cannot be predicted by any enemy attempting to jam the target detecting device and has no effect on the inherent probability of detecting a target. Any signal passed by the threshold of the receiver is processed and fed to the pulse repetition frequency generator and will randomly change the pulse repetition frequency of the transmitted signal.

1 Claim, 2 Drawing Figures

TARGET DETECTING DEVICE WITH IMPROVED COUNTER-COUNTERMEASURES CAPABILITY

The invention herein described may be manufactured and used by or for the Government of the United States of America for governmental purposes without the payment of any royalties thereon or therefor.

FIELD OF THE INVENTION

The present invention relates to a pulse radar type target detecting device and more particularly to a pulsed radar type target detecting device wherein the pulse repetition frequency of the transmitted signal is randomly varied.

DESCRIPTION OF PRIOR ART

In a pulsed radar type radar an enemy countermeasures system can analyze the transmitted signal and transmit a signal which when received by the target detecting device will see the signal as a true target. Various means have been devised to prevent the target detecting device from tracking false target signals generated by an enemy countermeasures system. Such means have been increasing the frequency, increasing the pulse repetition rate, shifting the frequency, etc. Most of these means have been either unsuccessful or have been highly sophisticated and difficult to implement.

SUMMARY

The present invention provides a means for increasing the immunity of pulsed-type target detecting devices to electronic countermeasures devices. Information from the receiver is utilized to alter the transmitted pulse in a manner which cannot be predicted by an enemy attempting to jam the target detecting device. The receiver information utilized is evidence that a threshold crossing has occurred. This information is available from the counter which makes the statistical decision that target returns have occurred. The output of the counter is translated into a usable signal for modulating the target detecting device pulse repetition frequency according to its environment. Any pulsed jammer technique which depends upon the consistent periodicity of the target detecting device transmission to accomplish its goals (e.g., repeater jammer, swept-pulse repetition frequency jammer, etc.) can be rendered ineffective. Accordingly, an object of the invention is to provide a pulse type target detecting device with means to prevent it from being jammed by jammers that depend upon a consistent periodicity of the target detecting device transmission.

Other objects and many of the attendant advantages of this invention will become readily appreciated as the same becomes better understood by reference to the following detailed description when considered in connection with the accompanying drawings wherein.

Figure 1:
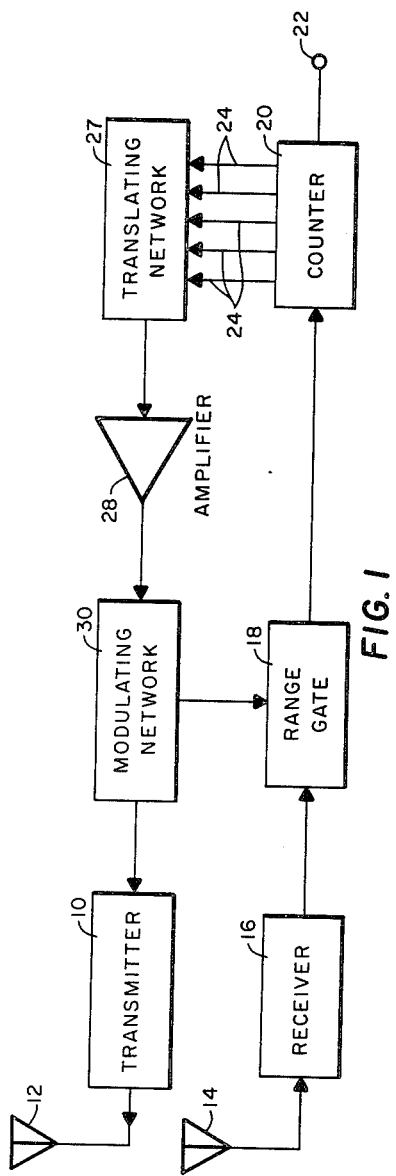
FIG. 1 is a block diagram of a target detecting device embodying the present invention.

Referring now to the drawings, there is shown in FIG. 1, in simplified block diagram form, a target detecting device which comprises a transmitter 10 for transmitting, by means of transmitting antenna 12, pulsed signals which when reflected from a target are received by means of receiving antenna 14 and fed to receiver 16. The signal out of receiver 16 is fed to range gate 18 where if of the proper amplitude and time sequence it is passed to counter 20. If the proper number of signals are received by counter 20 an output signal will appear at terminal 22 to be fed to the warhead detonation circuitry (not shown). Anytime a signal is passed by range gate 18, even though a firing signal is not fed to terminal 22, signals representing the received signals will appear at the outputs 24. The number of outputs depends upon the number of bits stored in the counter 20. Any signal appearing at any of the outputs 24 is fed through translating network 27 to amplifier 28 to provide a modulating signal to the input of modulating network 30. Modulating network 30 changes the pulse repetition frequency of transmitter 10 everytime a signal is received at counter 20. The modulation of the transmit period is accomplished by clampping the starting-point voltage of the R-C charging waveform on the base of the pulse repetition frequency multivibrator. The clamp level is controlled by the code generated when a received pulse shifts through counter 20. A synchronizing pulse is also fed from modulating network 30 to range gate 18 so that signals representing a line target will be accepted.

Figure 2:
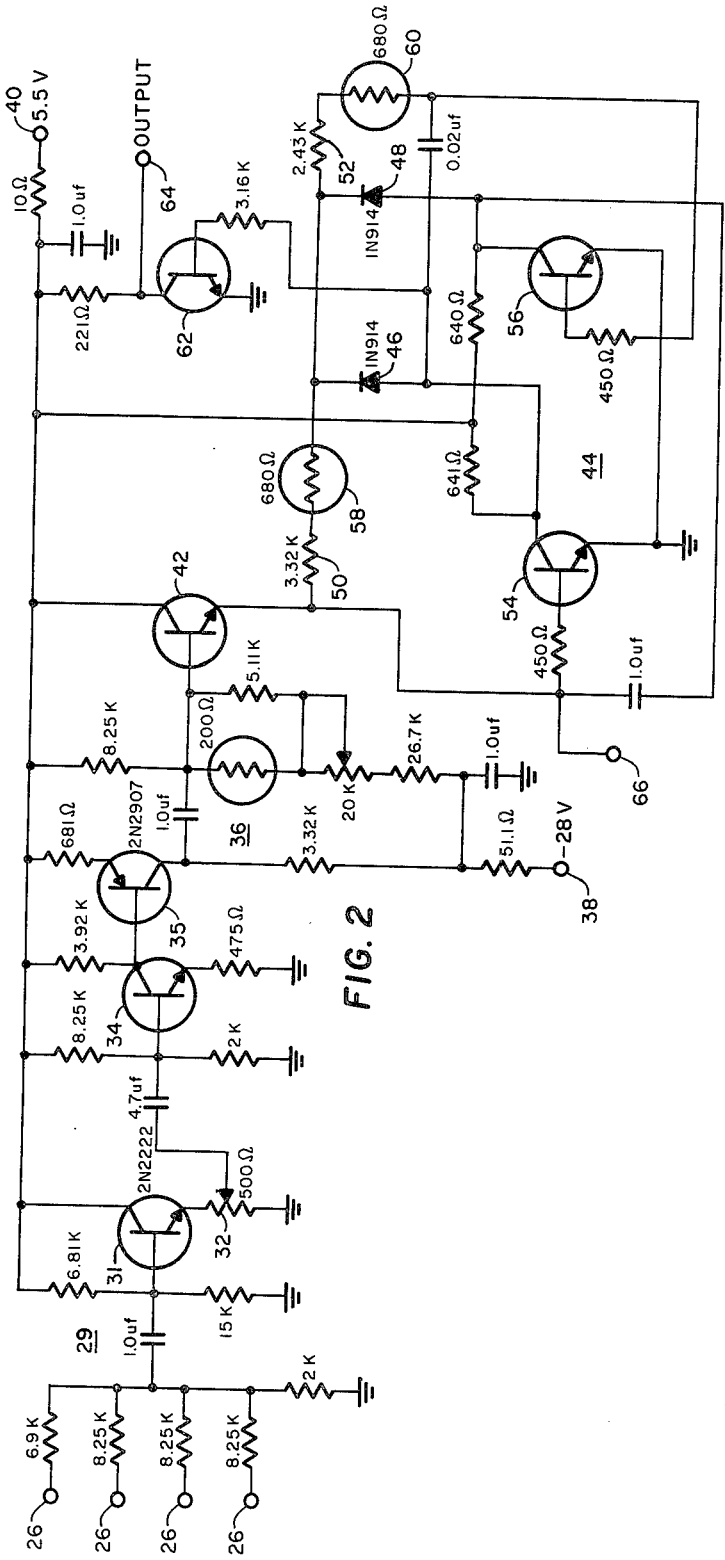
FIG. 2 is a schematic diagram of a preferred embodiment of the invention.

Referring now to FIG. 2 there is shown four input terminals 26 for accepting output signals from counter 20 (FIG. 1). The input signals are summed in summing circuit 29 and fed by means of emitter follower 31 and variable potentiometer 32 to the base of transistor 34, the first stage of a two stage amplifier. The amplified signal out of transistor 35, the second stage, is fed to a dc level restorer circuit 36 which includes a voltage divider network between the −28 volt terminal 38 and the +5.5 volt bus 40. The dc restored signal is coupled by emitter follower 42 as a clamping voltage to the output frequency of an astable multivibrator 44. Multivibrator 44 has been modified to insure self-starting and to compensate for ambient temperature. Self-starting is insured by means of diodes 46 and 48 connected respectively between timing resistors 50 and 52 and collectors 54 and 56. Temperature compensation is provided by means of thermistors 58 and 60. The output signal is taken from the collector of transistor 54 and fed through common emitter amplifier 62 to output terminal 64. A noise signal may be added at input terminal 66 to provide additional jitter of the transmitted signal. The components and values indicated in the schematic of FIG. 2 have been found satisfactory in practicing the invention.

We claim:

1. In a target detecting device having an improved counter-countermeasures capability, the combination comprising:
   (a) transmitter circuit means for transmitting pulsed signals,
   (b) receiver circuit means for receiving echos of said transmitted signals,
   (c) modulating network circuit means coupled to said transmitter circuit means for controlling the pulse repetition frequency of the transmitted signals,
   (d) range gate circuit means coupled to said receiver circuit means for passing signals of predetermined amplitude and time sequence,
   (e) counter circuit means coupled to said range gate circuit means and having a plurality of outputs dependent upon the number of signals passed by said range gate circuit means, (f) a summing network coupled to said counter circuit means for summing the outputs from said counter circuit means,
(g) an astable multivibrator coupled to said modulating network circuit means and to said summing network for randomly changing the output of said modulating network circuit means in response to and each time a received echo signal is accepted by said receiver circuit means and in accordance with the code generated when said received signals shifted through said counter circuit means.

* * * * *